United States Patent [19]

Hirohata et al.

[11] 4,415,252
[45] Nov. 15, 1983

[54] ELECTROMAGNETICALLY OPERATED SHUTTER

[75] Inventors: Michio Hirohata, Inagi; Yukio Ogawa, Kawasaki, both of Japan

[73] Assignee: Canon Kabushiki Kaisha, Tokyo, Japan

[21] Appl. No.: 353,507

[22] Filed: Mar. 1, 1982

Related U.S. Application Data

[63] Continuation of Ser. No. 114,497, Jan. 23, 1980, abandoned.

[30] Foreign Application Priority Data

| Jan. 31, 1979 [JP] | Japan | 54-9909 |
| Jan. 31, 1979 [JP] | Japan | 54-9910 |
| Jan. 31, 1979 [JP] | Japan | 54-9911 |

[51] Int. Cl.³ .............................................. G03B 9/22
[52] U.S. Cl. ..................................... 354/234; 354/264
[58] Field of Search .............. 354/230, 234, 235, 271, 354/59, 26, 30, 246, 264

[56] References Cited

U.S. PATENT DOCUMENTS

| 3,654,845 | 4/1972 | Fahlenberg et al. | 354/234 |
| 3,987,473 | 10/1976 | Kondo | 354/246 |
| 4,024,552 | 5/1977 | Kondo | 354/234 |
| 4,079,400 | 3/1978 | Kondo | 354/234 |

FOREIGN PATENT DOCUMENTS

| 139315 | 10/1978 | German Democratic Rep. | 354/234 |

*Primary Examiner*—Russell E. Adams
*Attorney, Agent, or Firm*—Toren, McGeady and Stanger

[57] ABSTRACT

An electromagnetically operated shutter includes a conductive member which has a number of radial components from the center of rotation of a sector ring, and is arranged on a plane parallel with the sector ring. The conductive member is secured to the sector ring, and a Lorentz force is generated by a magnetic field in the direction of the photographing optical axis, which force is applied to the conductive member so that the sector ring is caused to rotate to open and close the photographing optical path with a set of shutter blades. The radial components of the conductive member are arranged to be long by concentrating them in the vicinity of the diagonal lines of a rectangular space within a camera, and the conductive member is arranged to be rotatable within a predetermined angle range in this vicinity. The conductive member can be formed into a printed pattern which is arranged to increase, within a limited coil length, the length of the effective portion thereof for generating the Lorentz force. To stabilize the operation of the shutter, a spring is provided which urges the sector ring to move in the direction of shutter closing, and the total amount of the Lorentz force on the sector ring is arranged to increase as the shutter opens.

8 Claims, 12 Drawing Figures

ELECTROMAGNETICALLY OPERATED SHUTTER

This is a continuation of application Ser. No. 114,497 filed Jan. 23, 1980, now abandoned.

BACKGROUND OF THE INVENTION

1. Field of the Invention

This invention relates to an improvement of an electromagnetically operated shutter of the type having a coil arrangement in a plane in parallel with a sector ring. The ring is rotated with a Lorentz force generated by applying to the coil arrangement a magnetic field in the direction of the photographing optical axis, the rotation of the sector ring being arranged to open and close a set of shutter blades.

2. Description of the Prior Art

Camera shutters, that have shutter blades opened and closed by the rotation of a sector ring, include a type in which the sector ring is rotated by a group of permanent magnets arranged to form a magnetic field in the direction of an optical axis. The rotation force (dyne) of the sector ring of this electromagnetically operated shutter is determined by the magnetic flux density Bg (gauss) of the magnetic field produced by the magnet, a driving current I (ampere) which is arranged to flow to the coil, and the length of an effective portion of the magnetic field of the coil, i.e., in the coil winding, the length Lu (meter) of the winding component in the radial directions centering on the rotation axis of the sector ring. The rotating force F can be expressed by:

$$F = Bg \cdot \frac{I}{10} \cdot Lu$$

The rotating force F, therefore, can be made greater by increasing either the magnetic flux density Bg, the current I or the effective length Lu of the coil. However, the limited space available within the camera, and the limited capacity of the power source in the camera impose a restriction on any attempt to increase the magnetic flux density Bg and the current I. Particularly in the case of an electromagnetically operated shutter to be incorporated in a compact camera, it is therefore necessary to have the length of the effective portion of the coil increased as much as possible while the magnets to be used must have an efficient shape and must be efficiently arranged.

Further, in an electromagnetically operated shutter of the type arranged to be urged by a spring in the direction of closing, and then to be closed by the force of the spring after it is opened, the shutter is charged by a return spring to a maximum degree when the shutter is fully opened. Therefore, assuming that the electromagnetic driving force remains constant throughout the process of opening the shutter, the difference between this electromagnetic driving force and the urging force of the return spring becomes minimal when the shutter is fully opened.

Such being the arrangement of the shutter, when a power source for the electromagnetic operation deteriorates, an adverse effect of this deterioration becomes noticeable in the vicinity of full opening of the shutter. In other words, either the shutter blades do not open to a prescribed maximum degree, or the shutter blades behave unstably in their full open state. Conversely, in the initial stage of opening the shutter, the urging force of the return spring is weak. Accordingly, the shutter blades are then greatly accelerated by the electromagnetic driving force. Therefore, even when the application of electromagnetic force is cut off by a control circuit, the shutter is not promptly closed and thus the responsiveness of the shutter becomes unsatisfactory.

SUMMARY OF THE INVENTION

It is an object of this invention to provide an efficient coil arrangement in an electromagnetically operated shutter of the type described above.

It is another object of this invention to provide a coil winding arrangement which increases the length of an effective portion of coil windings, or a coil pattern, for generating a Lorentz force in an electromagnetically operated shutter.

It is still another object of this invention to provide a coil pattern which enhances the ratio of effective length to the total length of a coil pattern in an electromagnetically operated shutter.

It is a further object of this invention to provide a coil-and-magnet arrangement which permits stable control over the rotation of a sector ring in an electromagnetically operated shutter.

It is still a further object of the invention to provide a coil-and-magnet arrangement which permits a sector ring to make a uniformly accelerated rotational motion in an electromagnetically operated shutter.

Another important object of the invention is the provision of a coil-and-magnet arrangement which stabilizes the rotation of a sector ring at a relatively low speed and, after the power supply to the coil arrangement is cut off, permits a shutter closing action to be carried out without any time lag.

An additional object of the invention is the provision of a coil-and-magnet arrangement which is not readily affected by the deterioration of a power source battery.

In accordance with an embodiment of the invention, coil windings, or a coil pattern are formed in the directions of the diagonal lines of a square region between a film magazine and a film take-up chamber in a camera, so that the length of the effective portion of each coil generating a Lorentz force can be increased.

In accordance with another embodiment of the invention, a coil pattern which is formed approximately into a sectoral shape or a trapezoid, and over a sector ring, has its shape arranged to approximate a rectangular shape, so that the ratio of length of the effective portion of each coil to the entire length thereof can be increased, so that the coil, within a limited space, can be arranged to have an effective portion to a greater extent within its limited length.

Further, in accordance with another embodiment of the invention, the rotation of a sector ring can be stably controlled by way of a spring which urges shutter blades in the direction of closing, while the coil pattern and permanent magnets are arranged such that the electromagnetic driving force increases as the shutter opens. Further, this arrangement makes the shutter lens vulnerable to the deterioration of the power source.

These and further objects and features of the invention will become apparent from the following detailed description of the preferred embodiments thereof taken in connection with the accompanying drawings.

DETAILED DESCRIPTION OF THE PREFERRED EMBODIMENTS

Figure 1:
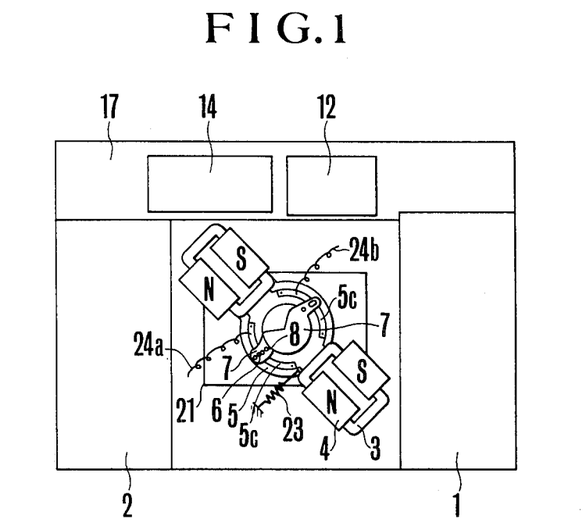
FIG. 1 is a front view showing the first embodiment of the present electromagnetically operated shutter mounted on a camera.
Figure 2:
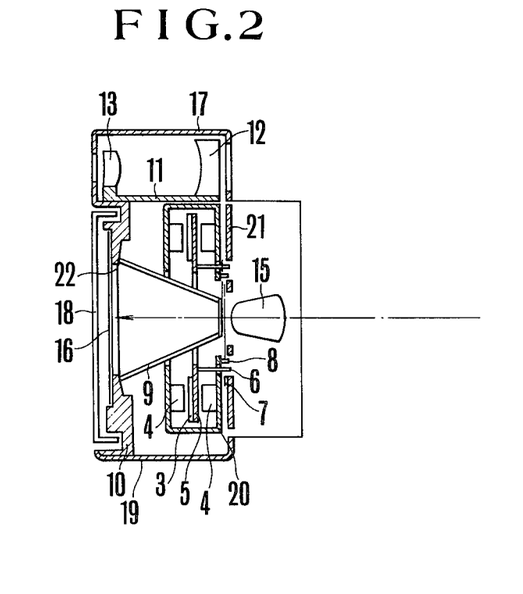
FIG. 2 is a sectional view of the camera of FIG. 1 showing an optical axis.
Figure 3:
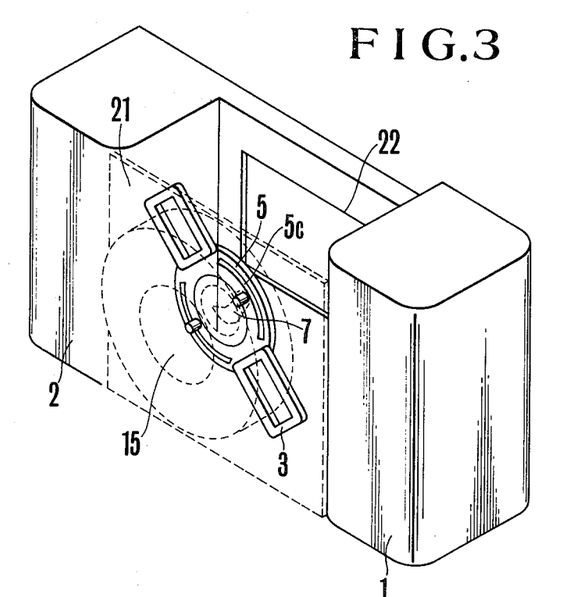
FIG. 3 is a schematic oblique view of the camera shown in FIGS. 1 and 2.

Referring to FIG. 1 which is a front view showing an embodiment of a camera to which the present invention is applied, FIG. 2 which is a sectional view taken across the middle part of the camera, and FIG. 3 which is oblique view of the camera showing the position of shutter members therein, there is provided a film magazine chamber 1 which provides a cylindrical space for inserting a film magazine. A film take-up chamber 2 forms a cylindrical space with a wind-up spool placed in the middle part of the space. The present electromagnetically operated shutter is placed within a rectangular space surrounded by the confronting side walls of the film magazine chamber and the film take-up chamber, a finder base plate 11 and the bottom lid 19 of the camera body. A driving coil arrangement 3 of the electromagnetically operated shutter comprises at least a pair of coils each of which is wound into a rectangular shape in a radial direction, perpendicularly to the photographing, optical axis, and is rotatably arranged between the magnetic fields of stators having magnets 4. The driving coil arrangement 3 is attached to a sector ring 5. On the sector ring 5, there is provided a conductive printed pattern 5c which is arranged to interconnect the coils. The sector ring is provided with sector pins 6 which are secured to the sector ring 5 and are arranged to transmit the rotating force of the sector ring 5 to shutter blades. A plurality of shutter blades 7 perform a combined function as a stop and are arranged to open and close a lens aperture. These shutter blades 7 are disposed in between yokes 20 forming the stators and a base plate 21 of the shutter. Rotation center shafts 8 of shutter blades 7 are provided so that the shutter blades are rotatably carried by these shafts 8. A camera obscura is formed by a light shielding cylinder 9. FIGS. 1, 2 and 3 also show the camera body 10; a view finder base plate 11; a view finder optical system 12,13 mounted on the view finder base plate 11; a distance measuring unit 14 which is either a double-lens range finder or an automatic focusing unit; a photograph taking optical system 15; a film 16; and the upper, rear and bottom lids 17, 18 and 19, respectively forming the external faces of the body of the camera. Each magnet 4 is securely positioned on a yoke 20 to form a magnetic circuit required for operating the shutter blades. The yokes 20 are attached to the shutter base plate 21 by a mounting means which is not shown. In addition to the electromagnetic driving device which is thus arranged on the shutter base plate, a lens barrel mechanism and the like are also mounted on the shutter base plate 21. The shutter base plate is secured to the camera body 10 by a mounting means which is not shown. A film exposing window is provided and a return spring 23 is mounted between the sector ring 5 and the shutter base plate 21, or the yoke 20, to urge the sector ring 5 to rotate clockwise as viewed on FIG. 1. The coils 3 are connected by lead wires 24a and 24b to terminals which are not shown.

Figure 4:
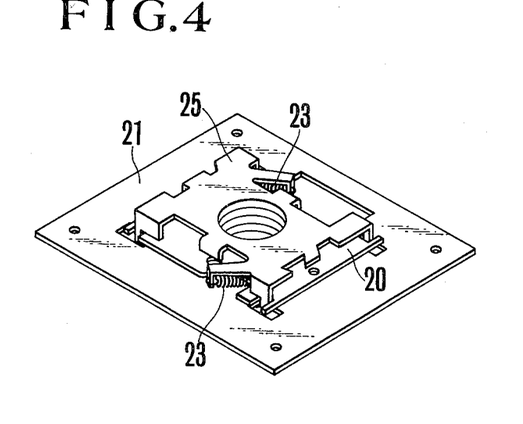
FIG. 4 is an oblique view showing a portion of the second embodiment of the present electromagnetically operated shutter.
Figure 5:
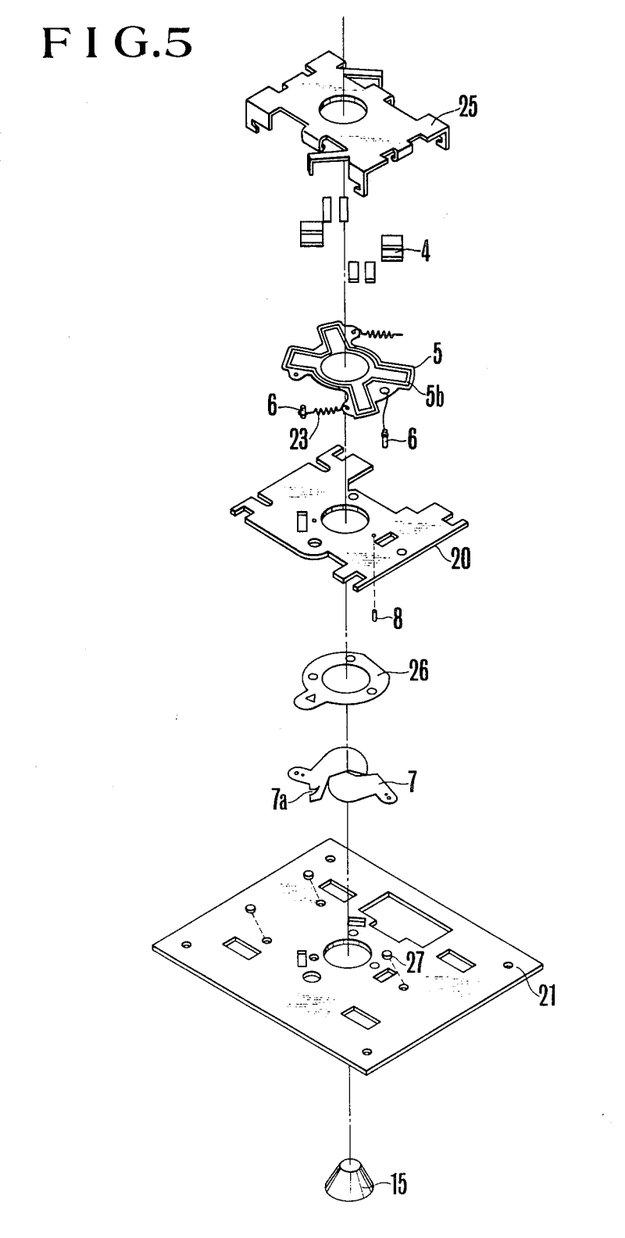
FIG. 5 is an exploded view showing the electromagnetically operated shutter of FIG. 4.
Figure 6:
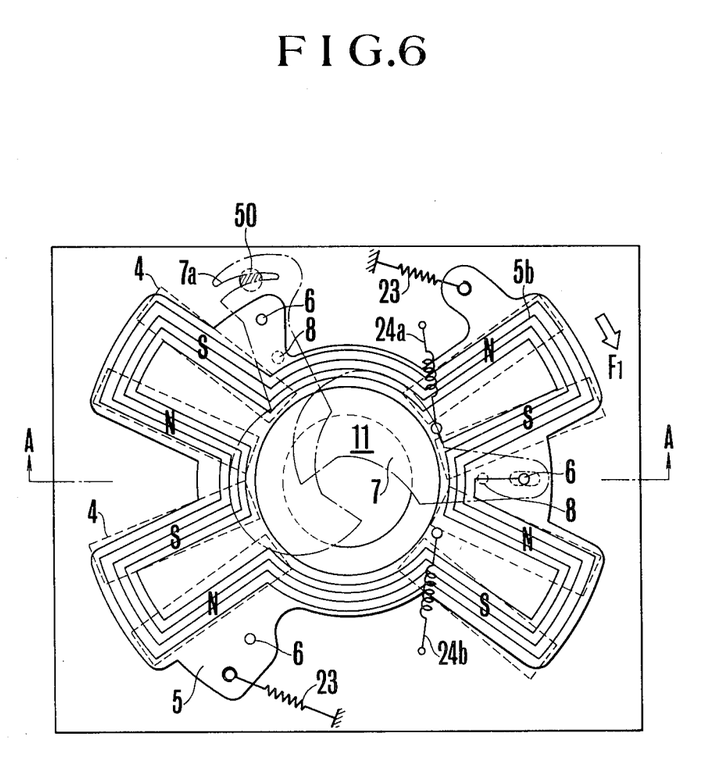
FIG. 6 is a schematic illustration showing the interrelation of the coil pattern, magnets, and shutter blades of the electromagnetically operated shutter of FIG. 5.

Another embodiment of the present electromagnetically operated shutter is represented by FIG. 4, which is an oblique view showing the essential part thereof. FIG. 5 is an exploded oblique view showing the shutter of FIG. 4. FIG. 6 is a plan view showing the positions of the coil pattern, magnets and shutter blades. In this particular embodiment, a printed coil pattern is employed in place of the driving coil arrangement shown in FIG. 1. The printed coil pattern is arranged by disposing two pairs of coils in radial directions on the sector ring which rotates on a plane perpendicular to the optical axis. Referring now to FIGS. 4 to 6, a conductive coil pattern is printed on the sector ring 5. The coils which are printed on the surface and the reverse side of the sector ring are connected to each other by means of the sector pins 6 provided on the sector ring 5. Of a plurality of the shutter blades 7, two of them are shown. An auxiliary stop 7a is provided in one of the shutter blades. There is provided a light sensitive element 50 which is arranged such that the quantity of incident light upon it is variable as the auxiliary stop varies in response to the opening and closing of the shutter blades.

Referring to FIG. 6, the shutter blades 7, which serve a combined function as a stop, are made of a non-conductive material such as a light shielding thermoplastic resin or a thermosetting resin. The sector ring 5 is made of a non-conductive material such as a non-magnetic glass-epoxy resin or other plastics. Coil-like conductive patterns 5a and 5b are printed on the surface and the reverse side of the sector ring 5. Fixed magnets are arranged to rotate the sector ring 5 when a driving current is allowed to flow thereto. The shutter blades 7 are arranged to operate as the sector ring 5 rotates. In other words, the printed patterns 5a and 5b are arranged to generate a force for rotating the sector ring 5 by Fleming's rule within the magnetic field of fixed poles. Further, the sector ring 5 is urged by a shutter closing spring 23 to rotate in the shutter closing direction. The shutter blades are, therefore, normally kept in a closed state. The rotation of each shutter blade 7 takes place on a fixed shaft 8 which is secured to a yoke 20. The rotating force of the sector ring 5 is transmitted to the shutter blades 7 by a plurality of dowels 6 which are made of a conductive material and are secured to the sector ring 5.

These dowels 6 are either caulked or soldered to the sector ring 5 and are arranged such that the conductive patterns printed on the surface and the reverse side of the sector ring are electrically connected to each other by one of them. The auxiliary stop 7a is arranged to control light incident upon the light sensitive element 50 for exposure control, and the yoke 20 is arranged to form magnetic flux paths from magnets and is made of a soft magnetic material. Fixed magnets 4 are arranged one after another in the circumferential direction on the sector ring to confront the printed pattern with their N and S poles alternately disposed adjacent to each other. The magnetic fluxes produced by them are arranged to pierce through the conductive parts of the printed pattern, which parts are in the radial directions.

Figure 11:
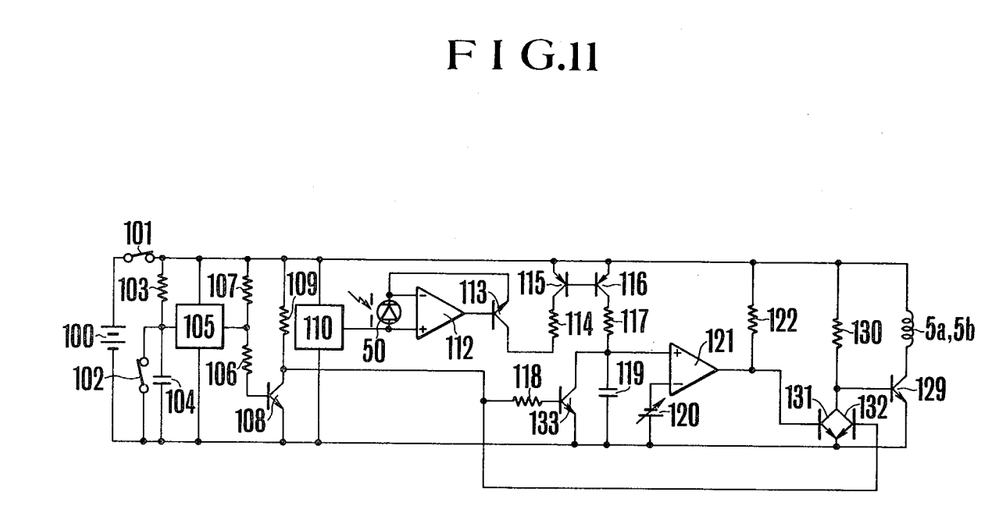
FIG. 11 is a circuit diagram showing an example of the control circuit of the present electromagnetically operated shutter.

The electromagnetically operated shutter which is shown in FIGS. 4, 5 and 6 operates in the following manner: When a release button (not shown) is operated, the operation actuates a driving circuit which is shown in FIG. 11. Then, a current flows from a first terminal 24 of the coil arrangement of the conductive patterns toward a second terminal thereof. A rotating force $F_1$ is then produced by the current components which flow in the radial directions of the conductive patterns within the magnetic fields of the fixed magnets 4, in accordance with Fleming's rule as indicated in FIG. 6. This force $F_1$ causes the sector ring 5 to rotate against the urging force of the shutter closing spring 23. The rotation of the sector ring 5 is transmitted by the sector pins 6 to the shutter blades 7 to gradually open them. The quantity of the light incident upon the light sensitive element 50 coming through the auxiliary stop 7a increases as the shutter blades are opened. When this light reaches a predetermined quantity, the current flowing from the driving circuit is cut off. Then, the restoring force of the shutter opening spring 23 causes the sector ring 5 to rotate counterclockwise and the shutter blades 7 are closed.

Figure 7A:
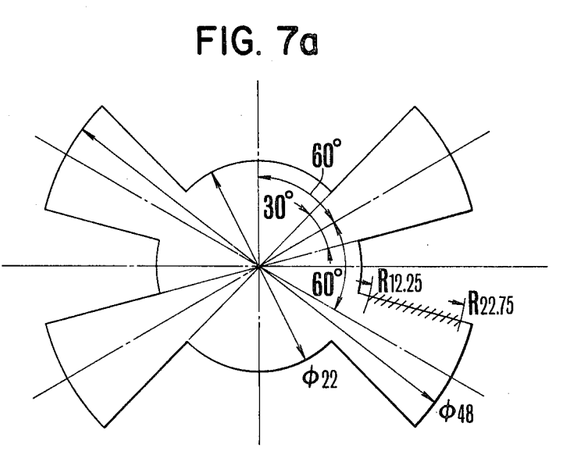
FIG. 7(a) and FIG. 7(b) are schematic illustrations showing features of the coil pattern of the electromagnetically operated shutter.
Figure 7B:
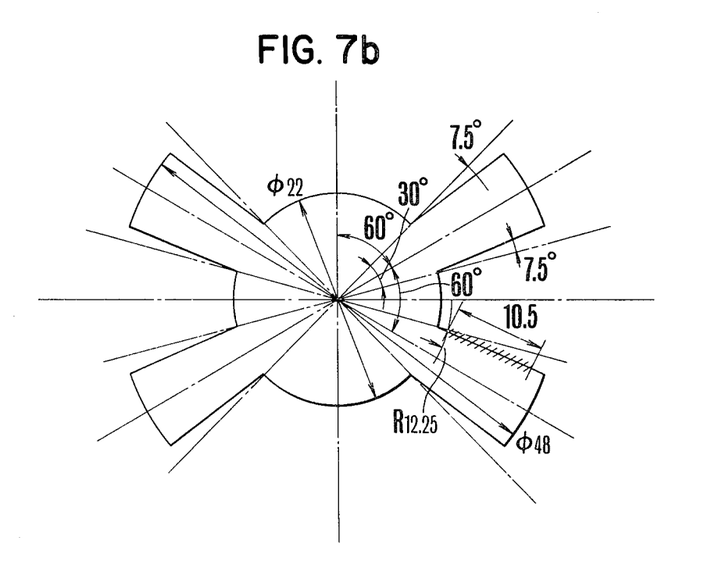

The conductive coil pattern arrangement of two pairs of sectoral coil parts is as shown in FIGS. 7(a) and 7(b). FIG. 7(a) shows a conventional pattern and FIG. 7(b) shows an example of the pattern arranged in accordance with the present invention. Further, the coil pattern to be used in practising the present invention includes many conductors arranged on a plane as shown in FIG. 6. FIG. 7(a) indicates the optical axis 0. With the optical axis in the center of the conductive pattern, the inner diameter of the pattern is, for example, 22 mm while the outer diameter thereof is, for example, 48 mm. The pattern consists of sectoral parts of 30 degrees arranged to be in centered symmetry. In the case of the conventional pattern arrangement shown in FIG. 7(a), the conductors arranged in the radial direction of the sectoral pattern completely coincide with radial lines centering at the optical axis. Whereas, in the conductive pattern of the present invention which is shown in FIG. 7(b), each sectoral part of the conductive pattern is arranged to be closer to a rectangular shape by deflecting it 7.5 degrees toward the center line of the sectoral shape. As shown in FIG. 7(b), with this arrangement, the length of the conductive pattern in the circumferential direction of the sectoral shape becomes shorter than the corresponding length of the conventional conductive pattern shown in FIG. 7(a).

Assuming that a magnetic field is applied between the points R12.25 mm and R22.75 mm as shown in FIG. 7(a), the effective length of one side of each coil is 22.75 − 12.25 = 10.5 mm and the total effective length per turn of winding of four coils is 10.5 × 8 = 84 mm. Since the total coil length is 200.3 mm, the ratio of the effective coil portion to the total coil length is 41.9%.

In the case of FIG. 7(b), if the effective length of one side is also assumed to be 10.5 mm, the total effective length per turn of winding of four coils is 84 mm. Then, since the total coil length is 191.6 mm, the ratio of the effective coil portion to the total coil length is 43.8%, which is better than the conventional arrangement shown in FIG. 7(a).

The moment component of a Lorentz force in the effective portion of the coil pattern shown in FIG. 7(b), as compared with the conventional coil pattern shown in FIG. 7(a), works at a rate multiplied by cos 7.5° = 0.0014. Therefore, assuming that the ratio of the length over which the Lorentz force acts on the effective portion to the total length of the coils is an effective rate, the effective rate is $$\frac{43.8 \times 0.09914}{41.9} = 1.036.$$

Thus, it will be understood that the coil pattern of FIG. 7(b) excels in effective rate by 3.6%. When the angle $\theta$ of the above deflection is arranged to be greater, the length in the circumferential direction becomes shorter, however, and the difference between the Lorentz force and the moment directions increases. Therefore, the value multiplied by cos $\theta$ decreases and improvement in the effective rate is no longer possible. Therefore, it is preferable to set the deflection angle $\theta$ between 0° and 15° or thereabout.

In the embodiment shown in FIGS. 6 and 7, the angle between adjacent sectoral pattern parts is set at 30°. This angle is set in consideration of strokes and to prevent each radial component of the conductor from coming into an adjacent magnetic field. This angle, therefore, may be set at a desired angle around 30°. Further, in the embodiment shown in FIGS. 6 and 7, the conductive coil pattern does not have the sectoral pattern parts in the vertical directions. This is partly for the purpose of permitting arrangement there of mechanisms for driving a lens barrel, and the like.

Figure 8:
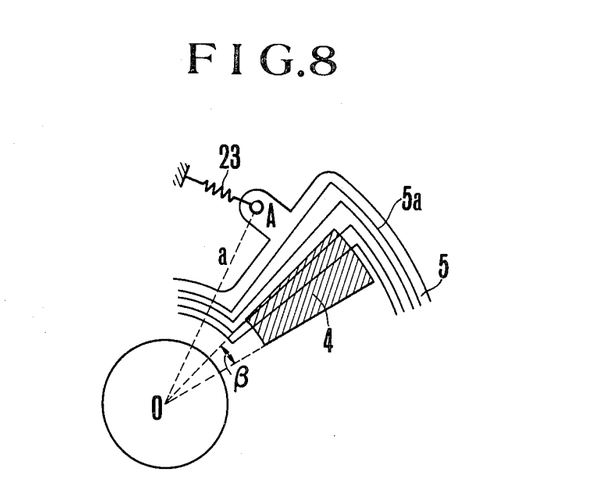
FIG. 8 is a schematic illustration showing an overlapping state of the coil pattern and permanent magnets of the present electromagnetically operated shutter.

FIG. 8 shows the operation of the electromagnetically operated shutter shown in FIG. 6, with the same parts indicated by the same reference numerals and symbols as in FIG. 6. Referring now to FIG. 8, let us assume that the rotating deflection angle of the sector ring 5 is $\alpha1$ (radian); the distance from the center 0 of the sector ring 5 to the acting point A of the closing spring 23 is a; the closing spring 23 is arranged to urge approximately in the direction perpendicular to the direction 0A; and the spring constant of the closing spring 23 is k. Further assuming that, with the shutter blades in a closed state ($\alpha1=0$), the rotation moment by the initial tensile force of the closing spring 23 is To, the torque T to be applied to the sector ring 5 by the closing spring 23 can be expressed, if K=ka, by:

$$T = ka\alpha1 + To = K\alpha1 + To \qquad (1)$$

Let us assume that the magnet 4 has a sectoral shape as shown in FIG. 8; the angle of this sectoral shape of the magnet 4 is $\beta$ radian; when $\alpha1=0$, overlapping of the conductive pattern 5a and the magnet 4 is $\oplus 0$; overlapping $\beta$ of the magnet 4 relative to the displacement $\alpha2$ of the sector ring 5 when the shutter is fully opened is arranged to be $\beta = \alpha2 + \beta0$; and the width of the component of the conductive pattern 5 in the radial direction is also arranged to be $\beta$. Then, the Lorentz force produced by a current I flowing to the conductive pattern can be expressed by: $F \propto BIl$ wherein B represents magnetic flux density and l the effective length of the conductor. Since the effective length l of the conductor can be expressed by $$l = \frac{\beta 0 + \alpha 1}{\beta}$$

in cases where n sets of conductors are arranged within the magnetic field, the Lorentz force F becomes:

$$F \propto \left( \frac{nBI\beta 0}{\beta} + \frac{nBI\alpha 1}{\beta} \right) \quad (2)$$

Assuming that the mean value of the distance from the center 0 of the sector ring 5 is a', there obtains the relation of $$\frac{a'nBI}{\beta} = K'.$$

since n, B, I, $\beta$ and $\beta 0$ are constants, K' becomes a constant. Therefore, a torque T' which is produced by the Lorentz force F can be expressed by:

$$T' = K'\beta 0 + K'\alpha 1 = To' + K'\alpha 1 \quad (3)$$

Further, let us assume that $To' = K'\beta 0$. Since, from Formula (1), the closing torque T of the closing spring 23 is $T = To + K\alpha 1$, the difference between this closing torque T and the torque T' produced by the Lorentz force when the driving current I is allowed to flow to the conductor can be expressed by:

$$T' - T = To' - To + (K' - K)\alpha 1 \quad (4)$$

In Formula (4), if $K' = K$, the torque to be applied to the sector ring 5 is of a fixed value irrespective of the displacement 1 and, under such a condition, the sector ring 5 makes a uniformly accelerated motion. Thus, in order to have the condition of $K' = K$, the closing spring 23 is selected to have its spring constant satisfy $$\frac{a'nBI}{\beta} = \frac{k}{a}.$$

Then, the torque can be adjusted also by adjusting the initial tensile force of the closing spring 23.

Further, in cases where the shutter is to be operated for a camera, the shutter blades do not have to make an exactly uniformly accelerated motion. Therefore, it is not necessary to use sectoral shaped magnets to exactly satisfy the above stated condition, but rectangular magnets that are advantageous in terms of cost can be employed with the width of the conductor arranged to be less than the width of these magnets. With such an arrangement, the Lorentz force will saturate in the vicinity of the full open position of the shutter. However, since there is a sufficiently great force of inertia of the shutter blades, the shutter operation is not much affected by the saturation of the Lorentz force. Accordingly, even with such a structural arrangement, an effect equal to an increase in the Lorentz force can be attained by gradually increasing the overlapping ratio of the conductor and the magnetic field after the initial stage of the operation.

Figure 9:
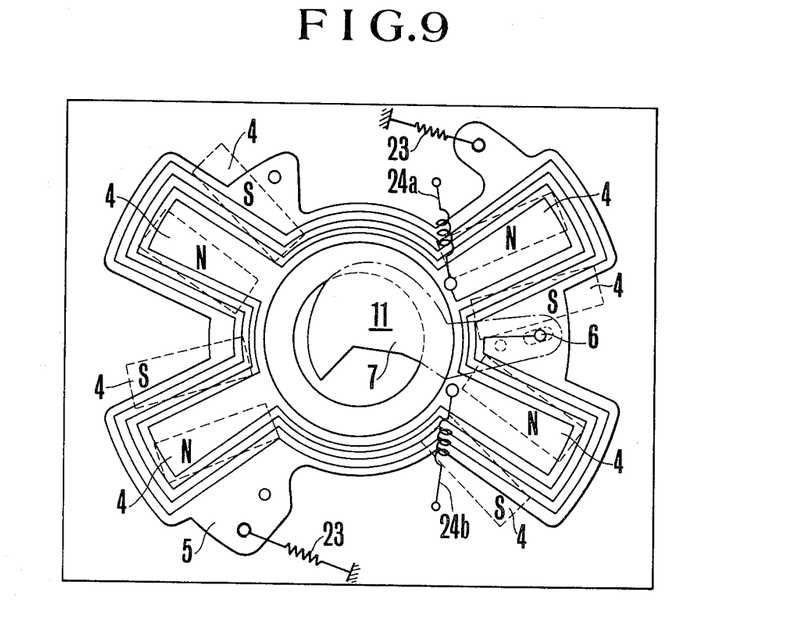
FIG. 9 is a schematic illustration showing the overlapping state of the coil pattern and permanent magnets in a completely closed condition.
Figure 10:
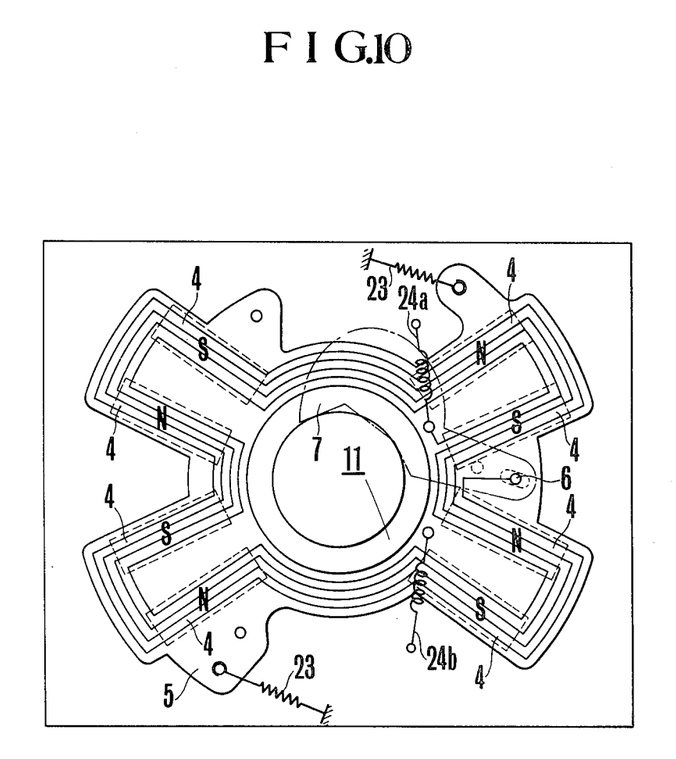
FIG. 10 is a schematic illustration showing the overlapping state of the coil pattern and permanent magnets in a completely opened condition.

FIG. 9 shows the positional relation of the conductive pattern to the magnets when the present electromagnetically operated shutter is closed, while FIG. 10 shows the same relation under a condition where the shutter is fully opened. As shown in FIG. 9, in the present electromagnetically operated shutter, the conductive pattern component in the radial direction overlaps the magnet to a less degree under the condition where the shutter is closed. However when the sector ring rotates to bring the shutter into a full open state as shown in FIG. 10, the whole radial direction component of the conductive pattern will overlap the magnetic field, so that the rate of bringing the conductor within the magnetic field can be arranged to reach a maximum in this position.

An embodiment of the control circuit of the present electromagnetically operated shutter is shown in FIG. 11. In FIG. 11, there are provided a power source battery 100 and a main switch 101 which is normally opened and is arranged to be operated by a first stroke of a release button. A release switch 102 which is normally closed is arranged to be operated either by a second stroke of the release button, or by a focusing completion signal of an automatic focusing camera. A time constant circuit is formed by a resistor 103 and a cpacitor 104. The time constant circuit is arranged to actuate a timer circuit 105 which operates to prevent chattering during a shutter release operation. There are also provided a constant voltage circuit 110 and a light sensitive element 50 for light measurement. In this particular embodiment, a silicon photo-cell is employed as the light sensitive element 50. The silicon photo-cell 50 is connected between two input terminals of an operational amplifier 112. Two ends of a capacitor 119 are arranged to be shortcircuited by a switching transistor 133. The collector side of the switching transistor 133 is connected to a non-inversion input terminal of a comparator 121. The inversion input terminal of the comparator 121 is connected to a variable voltage source 120 which is arranged to generate a signal representing the ASA sensitivity of the film employed. Reference numerals 131 and 132 indicate switching transistors provided for the purpose of controlling a transistor 129 which is arranged to turn on and off a power supply to the printed pattern coils 5a and 5b. The circuit which is arranged as described in the foregoing operates in the following manner:

When the main switch 101 is turned on, the output of the timer circuit 105 is at a low level (L) and the transistor 108 remains off because the release switch 102 is in a closed state. Since the transistor 133 is therefore on, the voltage at the inversion input terminal of the comparator 121 is almost zero and the output of the comparator 121 is at the L level. Further, since the transistor 108 remains off, the switching transistor 132 is turned on and, accordingly, the transistor 129 is turned off, the electromagnetic device of the shutter does not operate because the printed pattern coils 5a and 5b receive no power supply.

Next, when the release switch 102 is opened by a shutter release action, the timer circuit 105 is turned on to invert its output from the L level to a high level (H) after a length of time determined by the resistor 103 and the capacitor 104. Then, the transistor 108 is turned on. With the transistor 108 turned on, the transistors 132 and 133 are turned off. At this stage, the output of the comparator 121 still remains at the L level and the transistor 131 also remains off. Accordingly, the transistor 129 is turned on to have current supplied to the coils 5a and 5b, and the shutter begins to open. Concurrently, light falls on the light measuring silicon photo-cell 50 through the opening of the auxiliary stop. This causes a current proportional to the quantity of the incident light to flow to the capacitor 119. When the terminal voltage of the capacitor 119 reaches a set voltage value, in accordance with the ASA sensitivity of the film, at the voltage source 120, the output of the comparator 121 changes from the L level to the H level. Then, the switching transistor 132 is turned off. Therefore, the transistor 129 is also turned off to cut off the power supply to the coils.

What is claimed is:

1. An electromagnetically controlled shutter comprising:
    a rotor for causing at least one shutter blade to open or close a photographic optical path by rotation through a predetermined angle, said rotor having a rotational axis and having two arms extending in radial directions with respect to the rotational axis of the rotor and being substantially symmetrically arranged with respect to the rotational axis of the rotor;
    a conductor secured to the rotor and including a plurality of components extending radially with respect to the rotational axis of the rotor, said radial components being concentrated on respective arms of the rotor extending in the radial direction relative to the rotational axis;
    a return spring for biasing the rotor in a direction to close the shutter and for increasing its return force by rotation of the rotor as the shutter aperture increases;
    permanent magnets for forming a magnetic field in the direction of the rotational axis of the rotor and acting on the radial components of said conductive member, the polarity of said permanent magnets being arranged such that said magnetic fields and Lorentz forces produced by currents flowing in the radial directions of said conductive member act in the same direction relative to said rotor, said permanent magnets and the radial components being arranged relative to each other so that as a shutter blade opens the optical path, the overall length of said radial components in the magnetic field of the permanent magnet gradually increases and the Lorentz force on the rotor increases corresponding to the opening of the shutter blade.

2. An electromagnetically controlled shutter comprising:
    a rotor for causing at least one shutter blade to open or close a photographic optical path by rotation through a predetermined angle, said rotor having a rotational axis and having two arms extending in radial directions with respect to the rotational axis of the rotor and being substantially symmetrically arranged with respect to the rotational axis of the rotor;
    a conductor secured to the rotor and including a plurality of components extending radially with respect to the rotational axis of the rotor, said radial components being concentrated on respective arms of the rotor extending in the radial direction relative to the rotational axis;
    a return spring for biasing the rotor in a direction to close the shutter and for increasings its return force by rotation of the rotor as the shutter aperture increases;
    means for forming a magnetic field in the direction of the rotational axis of the rotor;
    the rotor including an additional two arms extending radially with respect to the rotational axis of the rotor and extending substantially symmetrically about the rotational axis and wherein the conductor includes components concentrated in each of the two pairs of arms.

3. An electromagnetically controlled shutter according to claims 1 or 2, wherein the conductor is a coil pattern printed on the rotor.

4. An electromagnetically controlled shutter according to claims 1 or 2, wherein the rotational axis of the rotor coincides with the photographic optical axis, and the rotor is provided at its center with an opening for passing photographic light.

5. An electromagnetically controlled shutter according to claims 1 or 2, wherein the conductor forms a coil with a plurality of turns.

6. An electromagnetically controlled shutter according to claims 1 or 2, wherein the components of the conductor in each arm of the rotor extend substantially radially to the rotational axis of the rotor and substantially parallel to each other.

7. An electromagnetically controlled shutter according to claims 1 or 2, wherein the shutter blade also functions as a diaphragm blade.

8. An electromagnetically controlled shutter according to claim 6, wherein the amount of light incident on a light receiving element outside the photographic optical path is varied in association with the opening or closing of the photographic optical path by at least one of the shutter blades.

* * * * *